United States Patent
Burbidge et al.

(10) Patent No.: US 9,648,582 B2
(45) Date of Patent: May 9, 2017

(54) RAN PAGING MECHANISM TO ENABLE ENHANCED COVERAGE MODE

(71) Applicant: Intel IP Corporation, Santa Clara, CA (US)

(72) Inventors: Richard C. Burbidge, Shrivenham (GB); Marta Martinez Tarradell, Hillsboro, OR (US); Hyung-Nam Choi, Hamburg (DE); Youn Hyoung Heo, San Jose, CA (US); Gang Xiong, Beaverton, OR (US); Debdeep Chatterjee, Santa Clara, CA (US); Seunghee Han, Cupertino, CA (US)

(73) Assignee: Intel IP Corporation, Santa Clara, CA (US)

( * ) Notice: Subject to any disclaimer, the term of this patent is extended or adjusted under 35 U.S.C. 154(b) by 4 days.

(21) Appl. No.: 14/753,158

(22) Filed: Jun. 29, 2015

(65) Prior Publication Data

US 2016/0135141 A1    May 12, 2016

Related U.S. Application Data

(60) Provisional application No. 62/076,382, filed on Nov. 6, 2014.

(51) Int. Cl.
*H04W 68/02* (2009.01)
*H04W 68/00* (2009.01)

(52) U.S. Cl.
CPC .......... *H04W 68/02* (2013.01); *H04W 68/005* (2013.01)

(58) Field of Classification Search
CPC ............................. H04W 68/02; H04W 68/005
(Continued)

(56) References Cited

U.S. PATENT DOCUMENTS 8,768,385 B2 *   7/2014   Chandramouli ...... H04W 68/00
                                                    370/312
9,065,616 B2 *   6/2015   Park ..................... H04L 5/0053
(Continued)

FOREIGN PATENT DOCUMENTS

WO    WO-2016073118 A1    5/2016

OTHER PUBLICATIONS

"International Application Serial No. PCT/US2015/054230, International Search Report mailed Jan. 22, 2016", 3 pgs.
(Continued)

*Primary Examiner* — Sharad Rampuria
(74) *Attorney, Agent, or Firm* — Schwegman Lundberg & Woessner, P.A.

(57) ABSTRACT

Devices and methods of enhanced coverage (EC) paging are generally described. An evolved Node-B (eNB) may transmit multiple EC paging messages to user equipment (UE) over at least one paging cycle. Each EC paging message may contain the same paging information. The UE may combine the individual EC paging messages to achieve a predetermined link budget and subsequently may decode the EC combined paging message to determine whether the combined paging message is directed to the UE. The EC paging messages may contain information for more than one UE and a legacy P-RNTI or a specific P-RNTI for EC mode UEs. The EC paging messages may be transmitted in legacy occasions over several paging cycles or non-legacy paging occasions over one or more paging cycles. The EC paging messages may be transmitted in continuous or non-continuous subframes in a particular paging cycle.

29 Claims, 4 Drawing Sheets

(58) Field of Classification Search
USPC .......................................................... 455/458
See application file for complete search history.

(56) References Cited

U.S. PATENT DOCUMENTS

| | | |
|---|---|---|
| 2004/0192257 A1 | 9/2004 | Stenberg |
| 2013/0051214 A1* | 2/2013 | Fong .................... H04W 24/10 370/216 |
| 2014/0098761 A1 | 4/2014 | Lee et al. |
| 2015/0131579 A1* | 5/2015 | Li ........................ H04L 1/0072 370/329 |
| 2015/0365914 A1* | 12/2015 | Yu ........................ H04W 68/02 455/458 |
| 2016/0095076 A1* | 3/2016 | Xiong .................. H04L 5/0053 370/336 |
| 2016/0100380 A1* | 4/2016 | Jha ...................... H04W 68/005 455/458 |

OTHER PUBLICATIONS

"International Application Serial No. PCT/US2015/054230, Written Opinion mailed Jan. 22, 2016", 9 pgs.
"Paging coverage improvement details for MTC UEs", R1-140079, 3GPP TSG RANWG1 Meeting, (Jan. 31, 2014).
Alcatel-Lucent, et al., "Coverage enhancement mode operation", R1-132977, 3GPP TSG-RAN-WG1 Meeting, (Aug. 10, 2013).
Ericsson, et al., "Coverage enhancement targets for MTC UE", R1-133420, 3GPPTSG-RAN WG1 Meeting, (Aug. 10, 2013).

* cited by examiner

RAN PAGING MECHANISM TO ENABLE ENHANCED COVERAGE MODE

PRIORITY CLAIM

This application claims the benefit of priority to U.S. Provisional Patent Application Ser. No. 62/076,382, filed, Nov. 6, 2014, and entitled "RAN PAGING MECHANISM TO ENABLE ENHANCED COVERAGE MODE," which is incorporated herein by reference in its entirety.

TECHNICAL FIELD

Embodiments pertain to radio access networks. Some embodiments relate to paging mechanisms in cellular networks.

BACKGROUND

In third generation long term evolution (3GPP LTE) systems, there are a number of circumstances in which the network wishes to communicate with user equipment (UE) to notify the UE of incoming data or modification of system information. The network may page the UE by sending a paging message to initiate communications with a particular UE in idle mode or address the UE in connected mode, e.g. to notify modification of the system information. In some circumstances, the UEs may be located in geographic areas with poor network coverage or in which poor signal conditions exist, i.e., in areas in which the link budget is several dB below typical network values. Such areas may include inside buildings or isolated geographical areas. In such cases, UEs may not be able to communicate with the nearest serving base station (enhanced Node B (eNB)) in a manner to satisfy normal requirements of the current 3GPP standard. Machine Type Communication (MTC) from machine type devices (MTDs) poses a particular challenge in this regard due to small battery size and low power availability of the MTC UEs.

It would be therefore desirable to enable the network to successfully page or otherwise communicate control or other information with UEs that are located in geographic areas of poor network coverage or poor signal conditions.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION OF THE INVENTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
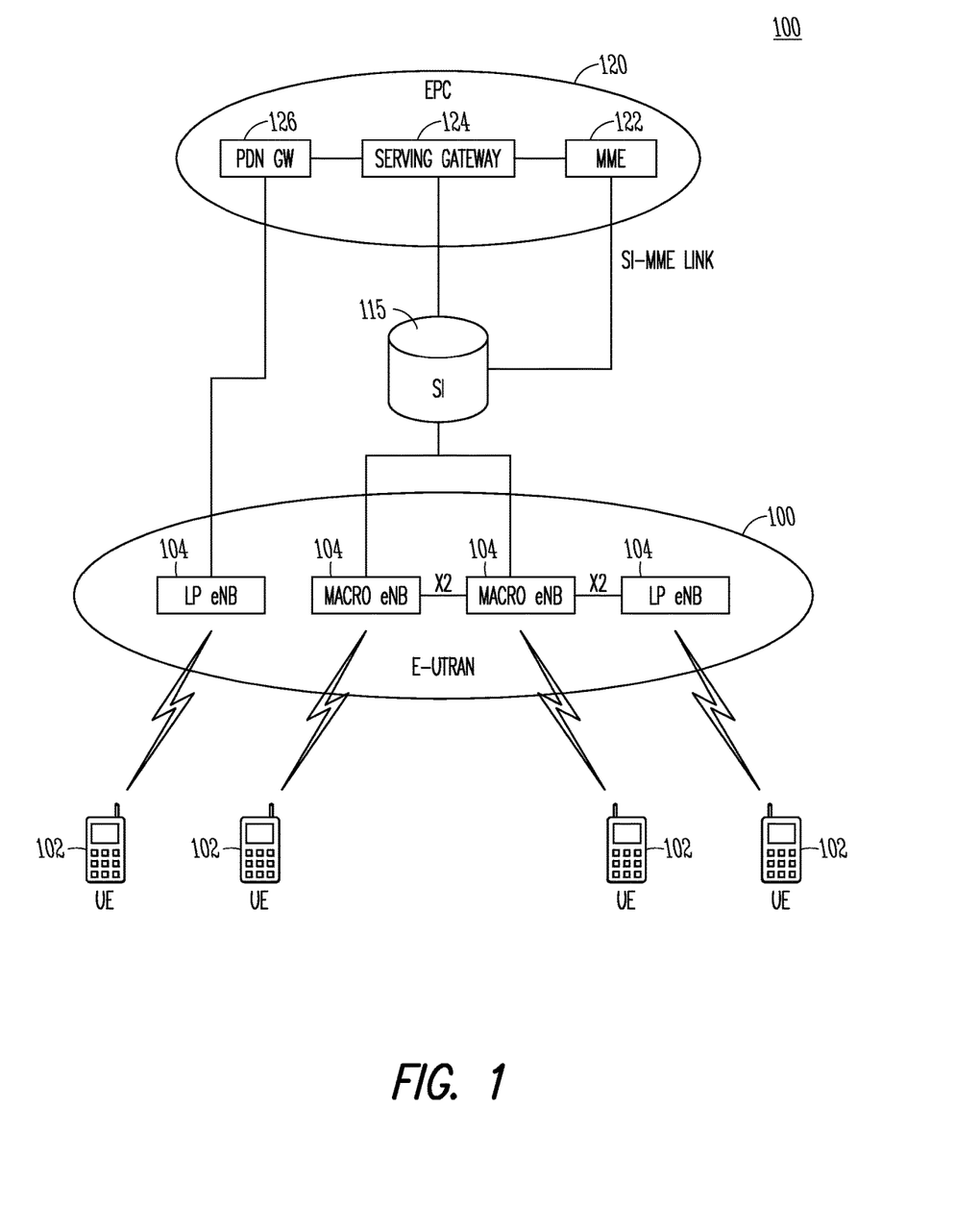
FIG. 1 shows an example of a portion of an end-to-end network architecture of an LTE network with various components of the network in accordance with some embodiments.

FIG. 1 shows an example of a portion of an end-to-end network architecture of a Long Term Evolution (LTE) network with various components of the network in accordance with some embodiments. As used herein, an LTE network refers to both LTE and LTE Advanced (LTE-A) networks as well as other versions of LTE networks to be developed. The network 100 may comprise a radio access network (RAN) (e.g., as depicted, the E-UTRAN or evolved universal terrestrial radio access network) 101 and core network 120 (e.g., shown as an evolved packet core (EPC)) coupled together through an S1 interface 115. For convenience and brevity, only a portion of the core network 120, as well as the RAN 101, is shown in the example.

The core network 120 may include a mobility management entity (MME) 122, serving gateway (serving GW) 124, and packet data network gateway (PDN GW) 126. The RAN 101 may include evolved node Bs (eNBs) 104 (which may operate as base stations) for communicating with user equipment (UE) 102. The eNBs 104 may include macro eNBs and low power (LP) eNBs.

The UEs 102 may include Low complexity (LC) UEs and/or UEs capable of enhanced coverage (EC) functionality or mode. A LC UE may have limited functionality compared with normal UEs and may communicate with general eNBs or be limited to communicating with eNBs specialized to interact with LC UEs. A LC UE may refer to a new UE category or type targeting to reduce the UE complexity as well as its cost. Examples of the LC UE category may include UE category 0 defined in 3GPP Rel-12 (and as described in Technical Report (TR) 36.888) or a new 3GPP Rel-13 LC type of UE, whose requirements are currently being discussed in Rel-13 RANI LC Machine-Type-Communications (MTC) Work Item (WI) and targets to reduce the RF/BB bandwidth (BW) e.g. to 1.4 MHz, reduce the maximum Transport Block Size (TBS) for unicast and/or broadcast transmission e.g. up to 1000 bits, relaxation of the measurements, etc. A LC UE may be referred with other name such as category M, category −1 or enhanced category 0. While the embodiments herein may mainly address the new Rel-13 LC UE, the embodiments described herein however are not restricted only to such UEs and may apply to future LC UEs that could be defined in future 3GPP releases. In addition, a Coverage Enhancement (CE) or Enhanced Coverage (EC) mode may refer to a mode of operation of the UE in which the UE may not be able to find a suitable cell (i.e., may not be within normal coverage of any cell) but can find a cell using EC procedures (i.e., may be within extended coverage of a cell). The EC mode is being considered as part of the requirements of Rel-13 RAN LC MTC WI and targets improving the UE coverage by ranges such as 5, 10, 15 or 20 dBs (also called coverage extension levels).

The MME 122 may be similar in function to the control plane of legacy Serving GPRS Support Nodes (SGSN). The MME 122 may manage mobility aspects in access such as gateway selection and tracking area list management. The serving GW 124 may terminate the interface toward the RAN 101, and route data packets between the RAN 101 and the core network 120. In addition, the serving GW 124 may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 may terminate an SGi interface toward the packet data network (PDN). The PDN GW 126 may route data packets between the EPC 120 and the external PDN, and may perform policy enforcement and charging data collection. The PDN GW 126 may also provide an anchor point for mobility devices with non-LTE access. The external PDN can be any kind of IP network, as well as an IP Multimedia Subsystem (IMS) domain. The PDN GW 126 and the serving GW 124 may be implemented in a single physical node or separate physical nodes.

The eNBs 104 (macro and micro) may terminate the air interface protocol and may be the first point of contact for a UE 102. In some embodiments, an eNB 104 may fulfill various logical functions for the RAN 101 including, but not limited to, RNC (radio network controller functions) such as radio bearer management, uplink and downlink dynamic radio resource management and data packet scheduling, and mobility management. In accordance with embodiments, UEs 102 may be configured to communicate orthogonal frequency division multiplexed (OFDM) communication signals with an eNB 104 over a multicarrier communication channel in accordance with an OFDMA communication technique. The OFDM signals may comprise a plurality of orthogonal subcarriers.

The S1 interface 115 may be the interface that separates the RAN 101 and the EPC 120. It may be split into two parts: the S1-U, which may carry traffic data between the eNBs 104 and the serving GW 124, and the S1-MME, which may be a signaling interface between the eNBs 104 and the MME 122. The X2 interface may be the interface between eNBs 104. The X2 interface may comprise two parts, the X2-C and X2-U. The X2-C may be the control plane interface between the eNBs 104, while the X2-U may be the user plane interface between the eNBs 104.

With cellular networks, LP cells may be typically used to extend coverage to indoor areas where outdoor signals do not reach well, or to add network capacity in areas with dense usage. In particular, it may be desirable to enhance the coverage of a wireless communication system using cells of different sizes, macrocells, microcells, picocells, and femtocells, to boost system performance. The cells of different sizes may operate on the same frequency band, or may operate on different frequency bands with each cell operating in a different frequency band or only cells of different sizes operating on different frequency bands. As used herein, the term low power (LP) eNB refers to any suitable relatively low power eNB for implementing a smaller cell (smaller than a macro cell) such as a femtocell, a picocell, or a microcell. Femtocell eNBs may be typically provided by a mobile network operator to its residential or enterprise customers. A femtocell may be typically the size of a residential gateway or smaller and generally connect to a broadband line. The femtocell may connect to the mobile operator's mobile network and provide extra coverage in a range of typically 30 to 50 meters. Thus, a LP eNB might be a femtocell eNB since it is coupled through the PDN GW 126. Similarly, a picocell may be a wireless communication system typically covering a small area, such as in-building (offices, shopping malls, train stations, etc.), or more recently in-aircraft. A picocell eNB may generally connect through the X2 link to another eNB such as a macro eNB through its base station controller (BSC) functionality. Thus, LP eNB may be implemented with a picocell eNB since it may be coupled to a macro eNB via an X2 interface. Picocell eNBs or other LP eNBs may incorporate some or all functionality of a macro eNB. In some cases, this may be referred to as an access point base station or enterprise femtocell.

Communication over an LTE network may be split up into 10 ms frames, each of which may contain ten 1 ms subframes. Each subframe of the frame, in turn, may contain two slots of 0.5 ms. Each subframe may be used for uplink (UL) communications from the UE to the eNB or downlink (DL) communications from the eNB to the UE. In one embodiment, the eNB may allocate a greater number of DL communications than UL communications in a particular frame. The eNB may schedule transmissions over a variety of frequency bands ($f_1$ and $f_2$). The allocation of resources in subframes used in one frequency band and may differ from those in another frequency band. Each slot of the subframe may contain 6-7 symbols, depending on the system used. In one embodiment, the subframe may contain 12 subcarriers. A downlink resource grid may be used for downlink transmissions from an eNB to a UE, while an uplink resource grid may be used for uplink transmissions from a UE to an eNB or from a UE to another UE. The resource grid may be a time-frequency grid, which is the physical resource in the downlink in each slot. The smallest time-frequency unit in a resource grid may be denoted as a resource element (RE). Each column and each row of the resource grid may correspond to one OFDM symbol and one OFDM subcarrier, respectively. The resource grid may contain resource blocks (RBs) that describe the mapping of physical channels to resource elements and physical RBs (PRBs). A PRB may be the smallest unit of resources that can be allocated to a UE. A resource block may be 180 kHz wide in frequency and 1 slot long in time. In frequency, resource blocks may be either 12×15 kHz subcarriers or 24×7.5 kHz subcarriers wide. For most channels and signals, 12 subcarriers may be used per resource block, dependent on the system bandwidth. In Frequency Division Duplexed (FDD) mode, both the uplink and downlink frames may be 10 ms and frequency (full-duplex) or time (half-duplex) separated. In Time Division Duplexed (TDD), the uplink and downlink subframes may be transmitted on the same frequency and are multiplexed in the time domain. The duration of the resource grid 400 in the time domain corresponds to one subframe or two resource blocks. Each resource grid may comprise 12 (subcarriers) *14 (symbols)=168 resource elements.

There may be several different physical downlink channels that are conveyed using such resource blocks, including the physical downlink control channel (PDCCH) and the physical downlink shared channel (PDSCH). Each subframe may be partitioned into the PDCCH and the PDSCH. The PDCCH may normally occupy the first two symbols of each subframe and carries, among other things, information about the transport format and resource allocations related to the PDSCH channel, as well as H-ARQ information related to the uplink shared channel. The PDSCH may carry user data and higher layer signaling to a UE and occupy the remainder of the subframe. Typically, downlink scheduling (assigning control and shared channel resource blocks to UEs within a cell) may be performed at the eNB based on channel quality information provided from the UEs to the eNB, and then the downlink resource assignment information may be sent to each UE on the PDCCH used for (assigned to) the UE. The PDCCH may contain downlink control information (DCI) in one of a number of formats that tell the UE how to find and decode data, transmitted on PDSCH in the same subframe, from the resource grid. The DCI format may provide details such as number of resource blocks, resource allocation type, modulation scheme, transport block, redundancy version, coding rate etc. Each DCI format may have a cyclic redundancy code (CRC) and be scrambled with a Radio Network Temporary Identifier (RNTI) that identifies the target UE for which the PDSCH is intended. Use of the UE-specific RNTI may limit decoding of the DCI format (and hence the corresponding PDSCH) to only the intended UE.

A PDCCH includes a legacy a PDCCH or enhanced PDCCH (ePDCCH) as well as other PDCCHs that may be defined such as for Rel-13 LC UEs that operate on a reduced BW (such as 1.4 MHz) for which a new LC-PDCCH or LC-ePDCCH may be also defined within the reduced BW region of the PDSCH. The PDCCH may use CCEs (control channel elements) to convey the control information. Before being mapped to resource elements, the PDCCH complex-valued symbols may be first organized into quadruplets, which may be then permuted using a sub-block inter-leaver for rate matching. Each PDCCH may be transmitted using one or more of these CCEs, depending on the size of DCI and the channel condition, where each CCE corresponds to nine sets of four physical resource elements known as resource element groups (REGs). Four QPSK symbols are mapped to each REG. There may be four or more different PDCCH formats defined in LTE with different numbers of CCEs (e.g., aggregation level, L=1, 2, 4, or 8). As will be discussed in more detail below, the PDCCH may be used by the network to provide paging to UE in idle mode.

Figure 2:
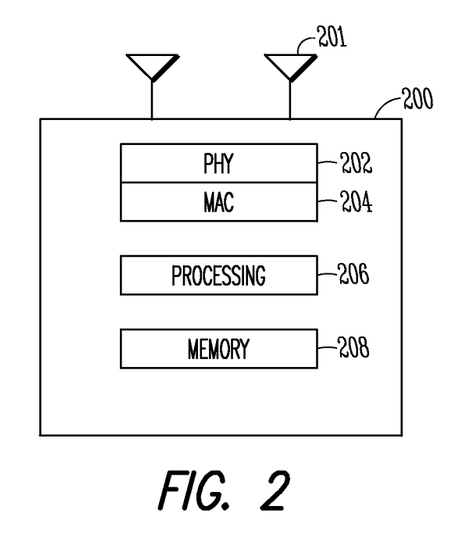
FIG. 2 illustrates a functional block diagram of a communication device in accordance with some embodiments.

FIG. 2 illustrates a functional block diagram of a communication device (e.g., an UE or eNB) in accordance with some embodiments. The communication device 200 may include physical layer (PHY) circuitry 202 for transmitting and receiving radio frequency electrical signals to and from the communication device, other eNBs, other UEs or other devices using one or more antennas 201 electrically connected to the PHY circuitry. The PHY circuitry 202 may include circuitry for modulation/demodulation, upconversion/downconversion, filtering, amplification, etc. Communication device 200 may also include medium access control layer (MAC) circuitry 204 for controlling access to the wireless medium and to configure frames or packets for communicating over the wireless medium. The communication device 200 may also include processing circuitry 206 and memory 208 arranged to configure the various elements of the cellular device to perform the operations described herein. The memory 208 may be used to store information for configuring the processing circuitry 206 to perform the operations.

In some embodiments, the communication device 200 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable device, a sensor, or other device that may receive and/or transmit information wirelessly. In some embodiments, the communication device 200 may include one or more of a keyboard, a display, a non-volatile memory port, multiple antennas, a graphics processor, an application processor, speakers, and other mobile device elements. The display may be an LCD screen including a touch screen.

The one or more antennas 201 utilized by the communication device 200 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated to take advantage of spatial diversity and different channel characteristics that may result between each of the antennas of a receiving station and each of the antennas of a transmitting station. In some MIMO embodiments, the antennas may be separated by up to $1/10$ of a wavelength or more.

Although the communication device 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs), and combinations of various hardware and logic circuitry for performing at least the functions described herein. In some embodiments, the functional elements may refer to one or more processes operating on one or more processing elements.

The embodiments described may be implemented in one or a combination of hardware, firmware and software. Embodiments may also be implemented as instructions stored on a computer-readable storage medium, which may be read and executed by at least one processor to perform the operations described herein. A computer-readable storage medium may include any non-transitory mechanism for storing information in a form readable by a machine (e.g., a computer). For example, a computer-readable storage medium may include read-only memory (ROM), random-access memory (RAM), magnetic disk storage media, optical storage media, flash-memory devices, and other storage devices and media. In these embodiments, one or more processors may be configured with the instructions to perform the operations described herein.

In some embodiments, the processing circuitry 206 may be configured to receive OFDM communication signals over a multicarrier communication channel in accordance with an OFDMA communication technique. The OFDM signals may comprise a plurality of orthogonal subcarriers. In some broadband multicarrier embodiments, the cellular device 200 may operate as part of a broadband wireless access (BWA) network communication network, such as a Worldwide Interoperability for Microwave Access (WiMAX) communication network or a $3^{rd}$ Generation Partnership Project (3GPP) Universal Terrestrial Radio Access Network (UTRAN) or a LTE communication network, an LTE-Advanced communication network, a fifth generation (5G) or later LTE communication network or a high speed downlink/uplink access (HSDPA/HSUPA) communication network, although the scope of the invention is not limited in this respect.

As above, in some embodiments, the UE may be a LC UE. The LC UE may be able to communicate over a limited RF or BW range, e.g., to 1.4 MHz, (rather than 20 MHz for a normal UE) and have a lower maximum Transport Block Size for unicast and/or broadcast transmission e.g., up to 1000 bits. Examples of LC UEs include UE category 0 defined in 3GPP Rel-12 (e.g., TR 36.888) or Rel-13 LC MTC. A LC UE may receive the limited or reduced BW in any location within the whole system BW. For example, if the system BW is 1.4 MHz, there may be only one possible location; however if the system BW>=1.4 MHz there may be a number of locations in which the 1.4 MHz BW may be located. In some embodiments, if the limited or reduced BW is 1 PRB, the reduced BW may be smaller than 1.4 MHz.

In some embodiments, the UE may be a legacy UE. The term legacy, as used herein, may refer to any device or system defined before 3GPP Rel-13. In some embodiments, the UE may be an enhanced coverage (EC) mode UE, which may refer to a mode of operation of the UE in which the UE cannot find a serving cell with sufficient link gain (i.e., the UE may not be within normal coverage of any cell) but can find a cell using EC procedures (i.e., the UE may be within extended coverage of a cell). These embodiments are described in more detail below.

As above, the UE may have several modes including an RRC connected mode and an idle mode. To control the modes of the UE, the eNBs and elements of the RAN or core network may have various timers associated with the UE. These timers may control state changes for the UE. In one embodiment, a Radio Resource Control (RRC) connection may for example be established between the UE and the eNB. One or more inactivity timers may be used by the eNB to determine the time from the last UE activity and consequently indicate to the UE to transition between one or more RRC connected states, as well as between an RRC connected state and an idle state. In an idle state, the network may release the UE to idle mode, in which there is no RRC connection established between the UE and any eNB, while the MME in the core network retains information about the tracking area in which the UE is registered.

In UMTS embodiments, for example, the RRC connected states may include a cell dedicated channel (Cell_DCH) state, a cell paging channel (CELL_PCH) state, a Universal Terrestrial Radio Access Network (UTRAN) Registration Area (URA) paging channel (URA PCH) state or a forward access channel (CELL_FACH) state.

After the UE enters idle mode, in one embodiment the eNB may subsequently transmit a paging message to the UE to notify the UE, e.g., about incoming data such as a phone call. The paging message may result in the UE initiating the establishment of an RRC connection. Because the UE is in idle mode however, the core network may not know to which cell of the RAN the UE is located. This may lead to the core network having the RAN page the UE over multiple cells in the tracking area in which the UE is registered to ensure that the UE will be reached by one of the paging messages.

In some embodiments, a paging procedure may be initiated by the MME, which may send S1-AP paging messages to the eNBs within the tracking area via the S1 interface using an S1 Application Protocol. Each eNB may then transmit RRC paging messages via a radio interface using the RRC protocol. The RRC paging message may include information directed to the eNB information from multiple S1 AP paging messages as, in one embodiment up to 16 different UEs may be paged at a time, using each UE's SAE Temporary Mobile Subscriber Identity (S-TMSI), in a single RRC paging message. The S-TMSI is a temporary UE identity provided by the core network that uniquely identifies the UE within the tracking area and may be constructed from the MME code (MMEC) (which identifies a MME uniquely within a MME group) and the MME TMSI (M-TMSI). In other embodiments, the number of UEs that may be paged in one paging occasion may be restricted by the core network to be fewer than 16. The MME may re-attempt the paging procedure, which in turn may trigger RRC paging message retransmission after a network-dependent amount of time has passed without receiving any response from the UE. The retransmission may be the same transmission as the preceding transmission, or may be directed specifically to the UE that has failed to respond. When paging is initiated by the MME, the eNB may determine a paging occasion in which the PDCCH will be monitored by the UE. The eNB may also initiate paging due to an Earthquake and Tsunami Warning System (ETWS) alert or due to system information change. In this case, paging may be transmitted on all paging occasions as it may not be directed to a particular UE. The PDCCH may indicate the difference between these paging incidents using the P-RNTI within the PDCCH to indicate that there is a PCH allocation sent within the PDSCH in the subframe.

In some embodiments, different paging procedures may exist depending on whether UEs are in the normal mode or in the EC mode. In such embodiments, the MME may determine whether the UE should be paged using EC paging procedures or using the normal paging procedures, which may be determined by the MME as well as by the eNB. This may be based, e.g., on the UE capability stored as UE context in the MME. The EC paging procedure may differ from the legacy paging procedure in one or more of any of a number of ways, including using a different P-RNTI (an EC-P-RNTI), a different paging message, different Discontinuous Reception (DRX) cycles and paging occasions, and different numbers and manners of repetitions and retransmissions. The EC-P-RNTI may be sent within a legacy PDCCH or within a new PDCCH defined within the reduced BW or a different/new ePDCCH to be defined. The EC paging procedure may allow a UE in EC mode to combine multiple paging transmissions to achieve a desired link budget for the paging messages that may otherwise be unachievable due to the UE being outside of the normal range of the serving eNB.

The UE may use DRX in idle mode in order to reduce power consumption and subsequently increase battery life. DRX allows the UE to reduce power by not continuously monitoring control channels and placing the RF modem in sleep state for long periods only permitting signals to be received at predetermined times. The UE may calculate when to wake to monitor the paging channel based on information contained in System Information Block 2 (SIB2), for example using defaultPagingCycle or a UE-specific paging cycle as indicated in TS 36.331. The embodiments described herein may also be applicable to future embodiments in which new rules or new information related to paging DRX cycles may be defined, such as an extended paging DRX cycle.

When DRX is used the UE may only monitor one P-RNTI in a PDCCH per DRX cycle to determine if a paging message is included. In one embodiment, if the UE detects the P-RNTI, the UE generally may subsequently decode the PDSCH to determine if the paging message is intended for the UE. A paging occasion is a subframe in which there may be a P-RNTI transmitted on the PDCCH addressing the paging message. When DRX is used, in one embodiment the UE may monitor only one paging occasion per DRX cycle.

EC paging retransmissions refer to retransmissions that may be used to reach a UE operating in EC mode. In one embodiment, the EC paging retransmissions may be controlled by the eNB and/or another network node such as the MME. While EC paging retransmissions are sent, in one embodiment, the content of the paging message is not changed in order for the UE in EC mode to be able to combine the repetitions and successfully decode the paging message, although the scope of the embodiments is not limited in this respect.

Figure 3A:
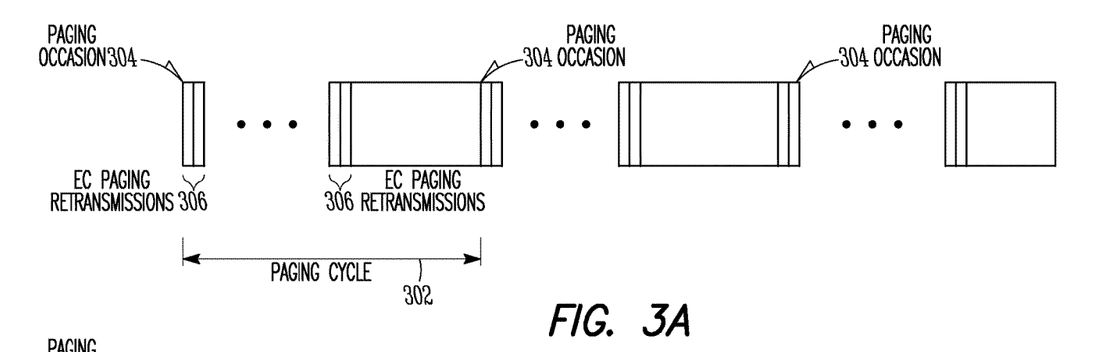
FIGS. 3A-3C illustrate enhanced coverage (EC) paging mechanisms in accordance with some embodiments.
Figures 3B, 3C:
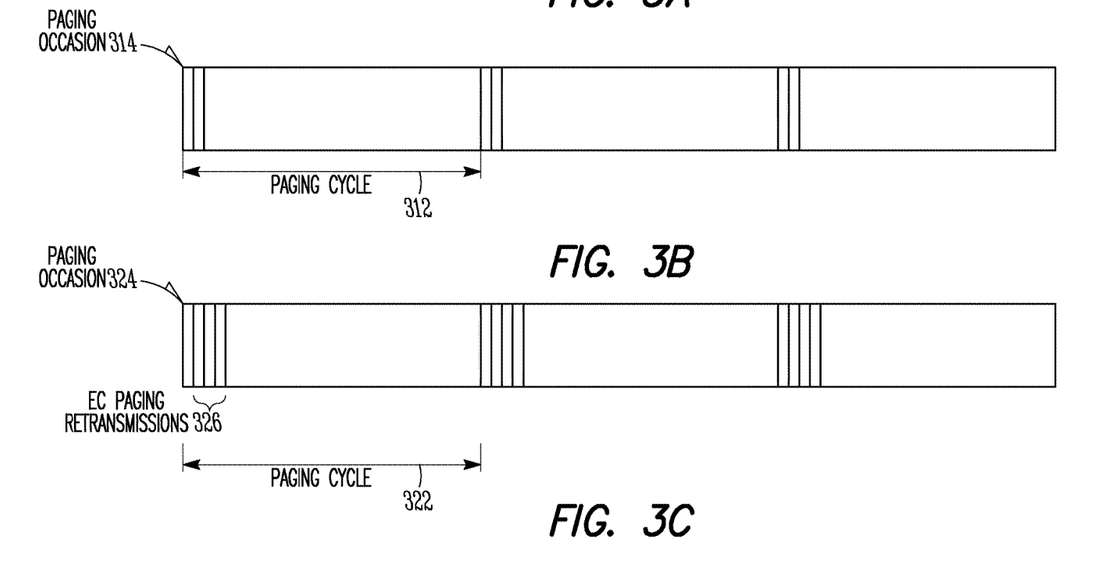

FIGS. 3A-3C illustrate EC paging mechanisms in accordance with some embodiments. FIGS. 3A-3C show paging cycles 302 with paging occasions 304 and different paging repetitions (i.e., paging retransmissions 306). Each paging cycle 302 in FIGS. 3A-3C may include multiple subframes (not shown) in which the UE may be paged multiple times and may monitor multiple paging occasions, unlike legacy paging in which the UE is paged a single time and may only monitor a single paging occasion per paging cycle per TS 36.304.

In FIG. 3A, a paging occasion 304 is transmitted at the beginning of each paging cycle 302 and repeated as a EC paging retransmission 306 across multiple subframes within the paging cycle 302. In other embodiments, the location of the paging occasion may be in locations other than the beginning of the paging cycle 302, e.g., based on the UE ID as defined by legacy formula as per 36.304. Thus, the EC paging retransmissions 306 may occur in subframes in which paging occasions would not occur in legacy paging mechanism. In this case, if, for example, the UE is an MTC UE that is in EC mode, the MTC UE may use cross-subframe channel estimation to further improve the performance in decoding the PDSCH once the MTC UE determines that the paging occasion 304 is directed towards paging for the MTC UE. Power consumption, however, may become an issue in some cases. In particular, as the legacy paging cycle may be 320 ms to 2.56 s and the UE monitors paging occasions in each paging cycle, having EC paging retransmissions across multiple subframes within each paging cycle may force the MTC UE to monitor an increased number of subframes. In some embodiments, the subframes may be non-consecutive and the frequency resources may also be different (e.g., due to frequency hopping). In some circumstances in which UEs may have different EC levels (e.g., to extend different distances while maintaining the predetermined link budget), resource collision may occur between multiple repeated paging transmissions within a single paging cycle that targets for MTC UEs with different EC levels.

To reduce the possibility of resource collision, FIG. 3B illustrates another EC paging mechanism in which the EC paging transmission may be repeated only on possible legacy paging occasions. Unlike the embodiment of FIG. 3A, in which the paging message transmission and retransmissions may be constrained to a single paging cycle, in this embodiment the paging message transmission and retransmission extend over multiple paging cycles. Unlike conventional paging mechanisms, in which paging occasions across different paging cycles may be independent (e.g., may page different UEs), in FIG. 3B, the paging occasions across multiple paging cycles may carry the same paging information to the same EC mode UEs.

In FIG. 3B, resource collision between multiple EC paging retransmissions within one frame may be avoided at the cost of an extended paging delay as, unlike legacy paging, multiple paging occasions 314 may be used to provide the desired link budget. However, this also may not increase the power consumption of the UE as UEs in EC mode may only attempt to decode a single paging transmission within a paging cycle 312. As the combination of multiple EC paging retransmissions transmitted by the eNB in different paging cycles is used to successfully decode the paging message, in one example of the delay, the shortest legacy paging cycle is 320 ms and if 80 repetitions are used to obtain the desired link budget, the delay will be 25.6 s. In these situations, a UE may take a factor of 100 higher than the legacy connection time to connect to the network. Thus, if the delay is increased by a factor of 100, the delay introduced by repeating EC paging transmission only on possible legacy paging occasions 314 may be tolerable. In one example, the range of the legacy paging cycle may be from 320 ms to 2560 ms, which may increase to 32 s-256 s using the EC paging transmission.

A third EC paging mechanism, shown in FIG. 3C, may combine the EC paging mechanisms of FIGS. 3A and 3B. As shown, a predetermined number (>1) of paging transmissions (paging occasion 324 and EC paging retransmissions 326) may occur within each paging cycle 322, as well as repeated transmission across a predetermined number (also >1) of paging cycles 324. The number of EC paging retransmissions 326 within a paging cycle 322 may differ from the number of paging cycles 322 across which the EC paging retransmissions 326 occur. Each of the number of EC paging retransmissions 326 within a paging cycle 322 and the number of paging cycles 322 across which the EC paging retransmissions 326 occur may be predefined and stored in a memory of the UE or may be configured by the eNB and transmitted to the UE, for example in the SIB. The number of EC paging retransmissions 326 within a single paging cycle 322 in the embodiment shown in FIG. 3C may be smaller than that shown in FIG. 3A, leading to reduced power consumption and decreased potential of resource collision compared with FIG. 3A. Like the EC paging mechanism of FIG. 3A, in FIG. 3C the EC paging transmissions within each paging cycle 322 may be transmitted in consecutive subframes or may be spread out so that at least some of the EC paging retransmissions 326 may be transmitted in non-adjacent subframes. In some embodiments, some of the EC paging retransmissions 326 may be transmitted in adjacent subframes while at least one EC paging retransmission 326 is transmitted in a non-adjacent subframe in each paging cycle.

The subframes in each paging cycle 322 on which EC paging retransmissions 326 are transmitted, as above, may be predefined and stored in a memory of the UE or may be configured by the eNB and transmitted to the UE. In some embodiments, the EC paging retransmissions 326, whether in adjacent subframes or non-adjacent subframes, may be somewhat close to maximize sleep time of the UE and conserve power. For example, in some embodiments, the EC paging retransmissions 326 may all occur with the first n subframes, whether adjacent or non-adjacent, while in other embodiments, some of the EC paging retransmissions 326 may occur in the first m subframes while some of the EC paging retransmissions 326 may occur in the last p subframes before the succeeding paging cycle 322 (where m, n, and p are all integers having values of 2 or more).

The paging information provided in the PDSCH may be combined using different techniques. In some embodiments, chase combining or incremental redundancy may be used. In chase combining the exact same information (e.g., data and parity bits) may be retransmitted in each PDSCH of each paging transmission. The received signals may be stored in a buffer of the UE and summed using maximum-ratio combining to provide the desired link budget. In incremental redundancy, every retransmission may contain different information. In particular, in incremental redundancy multiple sets of coded bits are generated each of which represents the same set of information bits and each transmission may use a different set of the coded bits with different redundancy versions. The redundancy version may be defined to improve decoding performance. For example, four redundancy versions (RV) [0, 1, 2, 3] may be defined for Turbo coding, which corresponds to different starting points in the circular buffer for coding and decoding. In one embodiment, an indication of whether chase combining or incremental redundancy is being used may be predefined by specification and stored in a memory of the UE or may be configured by higher layer signaling (such as RRC signaling) transmitted to the UE. In addition, the redundancy version pattern for the incremental redundancy transmission may be predefined and stored in a memory of the UE or may be configured by higher layer signaling transmitted to the UE. In various examples, a first predefined redundancy version pattern [0 2] may be used to signal an incremental redundancy transmission containing two repeated transmissions (RV=0 being used for the $1^{st}$ transmission and RV=2 used for the $2^{nd}$ transmission), while a second predefined redundancy version pattern [0, 2, 3, 1] may be used to signal an incremental redundancy transmission containing four repeated transmissions (RV=0 being used for the $1^{st}$ transmission, RV=2 used for the $2^{nd}$ transmission, RV=3 used for the $3^{rd}$ transmission, RV=1 used for the $4^{th}$ transmission). Frequency hopping may also be performed in conjunction with either chase combining or incremental redundancy transmissions to increase the link performance, especially for MTC or other LC UEs that may have limited frequency bandwidth communication capabilities. The frequency hopping parameters, as above, may be predefined and stored in a memory of the UE or may be configured by higher layer signaling transmitted to the UE.

In order to receive and make use of the paging retransmissions, the UE may maintain soft buffer information during idle mode sleep periods. In idle mode sleep periods, the UE normally has the RF and baseband components (e.g., transceiver, amplifiers) powered down, leading to the soft buffer being powered down and soft buffer content being lost. In embodiments such as those shown in FIG. 3B, in which the time between EC paging transmissions is somewhat large, the soft buffer may thus retain power once an EC paging transmission is received.

In various embodiments, it may be desirable for the UE to determine whether a paging message transmitted by the eNB is being transmitted using a legacy paging procedure, in which each paging message is singular, or an EC paging procedure, in which paging messages are to be combined. One manner of determining which type of procedure is being used, as noted above, is through the use of P-RNTI. In one embodiment, the legacy P-RNTI may be used for both the legacy paging procedure and the EC paging procedure. In this case, the P-RNTI may be transmitted by the eNB using a specific PRB in a specific region (e.g., frequency) and/or subframe, allowing the UE to determine which paging procedure is being used by the location (time and frequency) of the P-RNTI. The specific PRB used may or may not include a PRB used for legacy paging. In another embodiment, a different P-RNTI may be used (referred to hereinafter as an EC-P-RNTI). The EC-P-RNTI may be used to indicate all EC paging transmissions, whether the initial transmission or subsequent retransmissions. In another embodiment, different EC-P-RNTIs may be used to discriminate between the initial EC paging transmission and subsequent EC paging retransmissions. In another embodiment, a new EC-P-RNTI may be used to indicate only the initial EC paging transmission. In this last embodiment, the location of the EC paging retransmissions, as above, may be known by the UE predefined and stored in a memory of the UE or configured by higher layer broadcast or unicast signaling transmitted to the UE.

However, in other embodiments, information related to the type of paging procedure may not be dependent on the P-RNTI (either value or location) and may not depend on the PDCCH at all. In such embodiments, the PDCCH may not be transmitted, thereby reducing the network overhead for paging using the EC paging procedure. In some of these embodiments, the location of all EC paging transmissions may be known by the UE predefined and stored in a memory of the UE or configured by higher layer broadcast or unicast signaling transmitted to the UE. The UE may, at these locations, simply attempt to receive (and combine and decode) EC paging transmissions in the PDSCH. Alternatively, the frequency locations of the EC paging transmissions may be known by the UE predefined and stored in a memory of the UE or configured by higher layer broadcast or unicast signaling transmitted to the UE. In this case, the PRB index may be defined as a function of the identity of the UE (e.g., International mobile subscriber identity (IMSI) mod 4096), paging frame and/or paging occasion. The UE may then use other known characteristics, such as frequency regions, modulation and coding schemes (MCS), and PRB size to determine the paging scheduling. However, as the PDCCH is not used in the above embodiments, the PDSCH of each paging message may be combined and decoded by the UE, thereby leading to additional power consumption as compared with the legacy paging procedure in which an attempt is made only if the P-RNTI is present in the PDCCH.

In some embodiments, the temporal location of the initial EC paging transmission may occur at the same temporal location as legacy paging occasions. In this case, as described above, EC paging retransmissions may occur at temporal (and frequency) locations known to the UE. In some embodiments, however, the UE may differentiate paging occasions by having information about on which paging occasions the eNB may send a new EC paging message. The UE may obtain information about EC paging occasions via a network broadcast and use the information to determine the subframe the UE should start combining the received EC paging transmissions. In one example, the broadcast indicates the mod for determining the system frame number (SFN) in the paging frame calculation SFN mod (number provided in broadcast)=0. The network may alternatively indicate in the master information block or the system information block when new EC paging messages are sent. In another embodiment, information indicating the periodicity of the EC paging messages may be known by the UE either stored or transmitted through broadcast or dedicated signaling. The indication may be relative to legacy paging, such as indicating a relationship to a legacy paging occasion or providing a multiple of legacy paging DRX cycles.

Figure 4:
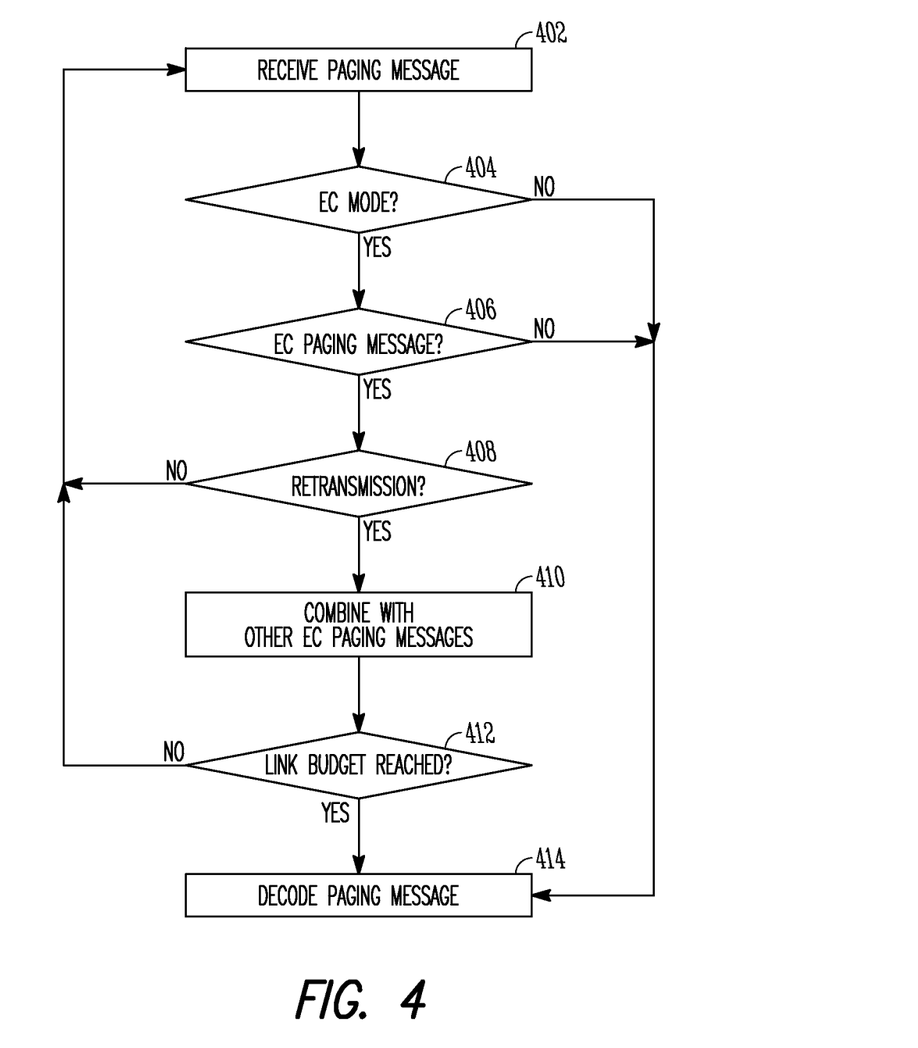
FIG. 4 illustrates a flowchart of a method of an EC paging mechanism in accordance with some embodiments.

FIG. 4 illustrates a flowchart of a method of an EC paging mechanism in accordance with some embodiments. The method may be performed by a UE, such as UE 102 (FIG. 1), to receive the paging message in any of FIGS. 3A-3C. In FIG. 4, a paging message may be transmitted by an eNB serving the UE and received by the UE at step 402. The UE may be in idle mode or may be in an RRC connected mode. The paging message may be received in a paging occasion (e.g., paging occasion 304 (FIG. 3A), may contain a P-RNTI in the PDCCH and data in the PDSCH of the paging occasion, and may contain information for more than one UE.

At step 404, the UE may determine whether it is in, or should switch to, EC mode for paging. The UE may determine that EC mode is appropriate when the UE is unable to obtain a predetermined link budget for communications with the eNB and the UE has the capability to enter EC mode. In some embodiments, the UE may not determine whether it is in EC mode and instead merely determine characteristics of the paging message. Although not shown, the UE may also determine which EC level it is in to later determine the proper course of action to take with regard to the EC paging message. When different EC levels are available for the UE, the levels may indicate different reception characteristics of the EC paging messages may cause the UE (and perhaps eNB) to act differently for the EC paging messages.

Once the UE determines that it is in EC mode, or if the determination is not performed, the UE may subsequently determine whether the paging message is an EC paging message at step 406. The UE may make the determination based on information in the PDCCH, such as a specialized P-RNTI, and/or temporal and/or frequency location of the paging message, among others. For example, if the EC paging transmission occurs at a legacy paging occasion, the UE may determine that the EC paging transmission is an initial EC paging transmission. The information to determine whether the paging message is an EC paging message may be defined by specification or provided to the UE via RRC or other higher layer signaling.

In response to the UE determining that the paging message is an EC paging message, at step 408 the UE may then determine whether the EC paging message is an initial EC paging transmission or an EC paging retransmission. Similar to the above, the UE may make the determination based on information in the PDCCH, such as a specialized P-RNTI, and/or temporal and/or frequency location of the paging message, among others. The information to determine whether the paging message is an EC paging retransmission may be defined by specification or provided to the UE via RRC or other higher layer signaling. If the EC paging message is an initial EC paging transmission rather than an EC paging retransmission, the UE may store the EC paging message and return to step 402 to wait for the following EC paging retransmission(s).

If the UE determines that the EC paging transmission is an EC paging retransmission, at step 410 the UE may combine the EC paging retransmission with other EC paging transmissions. The UE may maintain a soft buffer containing the accumulated paging information provided in the PDSCH of the EC paging transmissions. The paging messages may be combined chase combining or incremental redundancy, the latter of which the UE may have a redundancy version pattern of for the combining Frequency hopping may also be performed for chase combining or incremental redundancy transmissions to increase the link performance.

The UE may then at step 412 determine whether the number of combined EC paging transmissions to meet the predetermined link budget has been reached. The number of EC paging transmissions received by the UE to meet the link budget may depend on the EC level of the UE. If the number of combined EC paging transmissions to meet the link budget has not yet been reached, the UE may return to step 402 to wait for the next EC paging retransmission, either in the next consecutive or a non-consecutive subframe within the same paging cycle or the next paging cycle.

Once the UE determines that the number of combined EC paging transmissions to meet the link budget has been reached, that it is not in EC mode or that the paging message is not an EC paging message, at step 414 the UE may attempt to decode the PDSCH of the paging message (accumulated assuming an EC paging message) to determine if the paging message is intended for the UE. The number of EC paging transmissions of the EC paging message that are accumulated by the UE prior to the UE attempting to decode the EC paging message may differ dependent on the EC level of the UE.

Various examples of the disclosure are provided below. These examples are not intended to in any way limit the disclosure herein. In Example 1, a UE may comprise processing circuitry configured to: configure a transceiver to receive multiple enhanced coverage (EC) paging messages from an evolved Node-B (eNB) when the UE is in an EC mode; combine the EC paging messages to form a combined EC paging message; and decode the EC combined paging message to determine whether the combined paging message is directed to the UE.

In Example 2, the subject matter of Example 1 can optionally include that the processing circuitry is further configured to: configure the transceiver to receive a particular paging message from the eNB, determine whether the particular paging message is related to the EC paging messages, and in response to determining that the particular paging message is related to the EC paging messages, form the combined EC paging message using the particular paging message.

In Example 3, the subject matter of one or any combination of Examples 1-2 can optionally include that the particular paging message comprises a Paging Radio Network Temporary Identifier (P-RNTI) on a physical downlink control channel (PDCCH), and the processing circuitry is further configured to determine whether the particular paging message is an enhanced coverage (EC) mode paging message or a legacy paging message based on the P-RNTI.

In Example 4, the subject matter of one or any combination of Examples 1-3 can optionally include that the processing circuitry is further configured to: determine that the combined EC paging message has reached a predetermined number of EC paging messages received within a single paging cycle, wherein the EC paging messages within the paging cycle are received in a number of subframes, the number of subframes being specified for EC mode and predetermined in the UE or configured by higher layer signaling.

In Example 5, the subject matter of one or any combination of Examples 1-4 can optionally include that the processing circuitry is further configured to: determine whether the UE is in the EC mode, and configure the transceiver to receive the EC paging messages from the eNB using frequency hopping in response to determining that the UE is in the EC mode, wherein parameters of frequency hopping of the transceiver are predefined in the UE or configured in the UE via higher layer signaling.

In Example 6, the subject matter of one or any combination of Examples 1-5 can optionally include that a paging cycle of the EC paging messages is over multiple subframes, the EC paging messages within the paging cycle are received in a number of subframes predetermined or configured by higher layer signaling, and at least some of the subframes are non-adjacent.

In Example 7, the subject matter of one or any combination of Examples 1-6 can optionally include that the processing circuitry is further configured to: configure the transceiver to receive the EC paging messages at legacy paging occasions of consecutive paging cycles.

In Example 8, the subject matter of one or any combination of Examples 1-7 can optionally include that the processing circuitry is further configured to configure the transceiver to receive at least one of the EC paging messages within each paging cycle of consecutive paging cycles.

In Example 9, the subject matter of one or any combination of Examples 1-8 can optionally include that the processing circuitry is further configured to: use at least one of chase combining (CC) and incremental redundancy (IR) to combine the EC paging messages, use of the at least one of CC and IR is predefined in the UE or configured in the UE via higher layer signaling, and when IR is used by the processing circuitry to combine the EC paging messages, a redundancy version (RV) pattern of the IR is predefined in the UE or configured in the UE via higher layer signaling, and the use of CC or IR is determined based on the RV pattern.

In Example 10, the subject matter of one or any combination of Examples 1-9 can optionally include that the EC paging messages comprise an initial paging message and at least one retransmission of the initial paging message, and the processing circuitry is further configured to determine whether a particular paging message is the initial paging message or the at least one retransmission of the initial paging message.

In Example 11, the subject matter of one or any combination of Examples 1-10 can optionally include that the processing circuitry is further configured to: determine retransmission spacing of the EC paging messages; and determine whether to maintain a buffer during idle sleep periods of the UE dependent on the retransmission spacing.

Example 12, the subject matter of one or any combination of Examples 1-11 can optionally include that the EC paging messages comprise an initial paging message and at least one retransmission of the initial paging message, each of the EC paging messages comprises a Paging Radio Network Temporary Identifier (P-RNTI) on a physical downlink control channel (PDCCH), and the processing circuitry is further configured to determine whether a particular paging message is the initial paging message or the at least one retransmission of the initial paging message based on the P-RNTI.

In Example 13, the subject matter of one or any combination of Examples 1-12 can optionally include that the processing circuitry is further configured to: determine whether each paging message is an enhanced coverage (EC) mode paging message or a legacy paging message based on a position of the paging message in a paging cycle.

In Example 14, the subject matter of one or any combination of Examples 1-13 can optionally include that the processing circuitry is further configured to: receive the EC paging messages from the eNB on legacy paging occasions rather than non-legacy paging occasions.

In Example 15, the subject matter of one or any combination of Examples 1-14 can optionally include that the processing circuitry is further configured to determine that the UE is in an EC mode in response to determining that a link budget between the eNB and the UE is worse than a predetermined link budget.

In Example 16, the subject matter of one or any combination of Examples 1-15 can optionally include that the processing circuitry is further configured to determine a predetermined number of EC paging messages to meet the link budget between the eNB and the UE, and decode the combined EC paging message in response to combining the predetermined number of EC paging messages.

In Example 17, the subject matter of one or any combination of Examples 1-16 can optionally include an antenna configured to provide communications between the transceiver and the eNB.

In Example 18, an apparatus of an evolved Node-B (eNB) may comprise: processing circuitry configured to: determine whether user equipment (UE) attached to the eNB is in enhanced coverage (EC) mode; and configure a transceiver to transmit multiple paging messages to the UE over at least one paging cycle in response to determining that the UE is in EC mode, wherein successive ones of the paging messages are either the same or incrementally different.

In Example 19, the subject matter of Example 18 can optionally include that the processing circuitry is further configured to: configure the transceiver to transmit the paging messages on legacy paging occasions of multiple paging cycles, or configure the transceiver to transmit the paging messages on non-legacy paging occasions within at least one paging cycle.

In Example 20, the subject matter of one or any combination of Examples 18-19 can optionally include that the processing circuitry is further configured to: configure the transceiver to transmit UE paging messages to a plurality of different UEs in at least one occasion of the paging messages.

In Example 21, the subject matter of one or any combination of Examples 18-20 can optionally include that the processing circuitry is further configured to: determine a coverage extension level, of a plurality of coverage extension levels, of the UE, and configure the transceiver to transmit a number of paging messages dependent on the coverage extension level of the UE.

In Example 22, the subject matter of one or any combination of Examples 18-21 can optionally include that the processing circuitry is further configured to at least one of: configure the transceiver to transmit the paging messages within a single paging cycle using frequency hopping, or configure the transceiver to transmit at least one of the paging messages within each paging cycle of consecutive paging cycles.

In Example 23, the subject matter of one or any combination of Examples 18-22 can optionally include that the processing circuitry is further configured to: configure the transceiver to transmit paging messages with Paging Radio Network Temporary Identifiers (P-RNTIs) on physical downlink control channels (PDCCHs), the P-RNTI of a particular paging message dependent on whether the particular paging message is an enhanced coverage (EC) mode paging message or a legacy paging message.

In Example 24, the subject matter of one or any combination of Examples 18-23 can optionally include that: the paging messages comprise an initial paging message and at least one retransmission of the initial paging message, the processing circuitry is further configured to determine whether a particular paging message is the initial paging message or the at least one retransmission of the initial paging message based on the P-RNTI.

In Example 25, the subject matter of one or any combination of Examples 18-24 can optionally include that the processing circuitry is further configured to: configure the transceiver to transmit paging messages using a Paging Radio Network Temporary Identifier (P-RNTI) on a physical downlink control channel (PDCCH), a position of a particular paging message in the at least one paging cycle dependent on whether the particular paging message is an enhanced coverage (EC) mode paging message or a legacy paging message.

In Example 26, a non-transitory computer-readable storage medium that stores instructions for execution by one or more processors of user equipment (UE) to communicate with an evolved Node-B (eNB), the one or more processors may configure the UE to: enter an enhanced coverage (EC) mode; receive paging messages from the eNB, the paging messages including an initial paging message and at least one retransmission of the initial paging message; determine whether the paging message are EC mode paging messages; combine the paging messages, in response to determining that the paging messages are EC mode paging messages, to form a combined paging message; determine a link budget of the combined paging message; compare the link budget of the combined paging message to a predetermined link budget associated with coverage in a cell dependent on the EC mode; and decode the combined paging message, in response to determining that the link budget of the combined paging message has met the predetermined link budget, to determine whether the combined paging message is directed to the UE.

In Example 27, the subject matter of Example 26 can optionally include that the processor is further configured to at least one of: a) detect each of the paging messages using a Paging Radio Network Temporary Identifier (P-RNTI) on a physical downlink control channel (PDCCH), and i) determine whether each paging message is an EC mode paging message or a legacy paging message based on the P-RNTI, or ii) determine whether a particular paging message is the initial paging message or the at least one retransmission of the initial paging message based on the P-RNTI, and b) determine whether each paging message is an EC mode paging message or a legacy paging message based on a position of the paging message in a paging cycle.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus of a user equipment (UE), apparatus comprising:
a memory; and
processing circuitry in communication with the memory and configured to:
determine whether a physical downlink control channel (PDCCH), received from an evolved Node-B (eNB) when the UE is in an enhanced coverage (EC) mode, is encoded with an EC Paging Radio Network Temporary Identifier (EC-P-RNTI) the EC-P-RNTI different from a P-RNTI and to differentiate between transmission of an EC paging message and a legacy paging message;
in response to a determination that the PDCCH is encoded with the EC-P-RNTI, combine an enhanced coverage (EC) paging message with at least one other EC paging message to form a combined EC paging message;
decode the combined EC paging message; and
determine whether the combined paging message is directed to the UE.

2. The apparatus of claim 1, wherein the processing circuitry is further configured to:
determine that a predetermined number of EC paging messages have been received within a single paging cycle prior to the combined EC paging message being decoded, wherein the EC paging messages within the paging cycle are received in a number of subframes, the number of subframes being specified for EC mode and predetermined in the UE or configured by higher layer signaling.

3. The apparatus of claim 1, wherein the processing circuitry is further configured to:
determine whether the UE is in the EC mode, and
configure use of frequency hopping in reception of the EC paging messages from the eNB in response to a determination that the UE is in the EC mode, wherein parameters of frequency hopping of the transceiver are predefined in the UE or configured in the UE via higher layer signaling.

4. The apparatus of claim 1, wherein:
a paging cycle of the EC paging messages is over multiple subframes, the EC paging messages within the paging cycle are received in a number of subframes predetermined or configured by higher layer signaling, and at least some of the subframes are non-adjacent.

5. The apparatus of claim 1, wherein:
the EC paging messages are received at legacy paging occasions of consecutive paging cycles.

6. The apparatus of claim 1, wherein:
at least one of the EC paging messages is received within each paging cycle of consecutive paging cycles.

7. The apparatus of claim 1, wherein the processing circuitry is further configured to:
use at least one of chase combining (CC) and incremental redundancy (IR) to combine the EC paging messages, use of the at least one of CC and IR is predefined in the TIE or configured in the UE via higher layer signaling, and when IR is used by the processing circuitry to combine the EC paging messages, a redundancy version (RV) pattern of the IR is predefined in the UE or configured in the UE via higher layer signaling, and the use of CC or IR is determined based on the RV pattern.

8. The apparatus of claim 1, wherein:
the EC paging messages comprise an initial paging message and at least one retransmission of the initial paging message, and
the processing circuitry is further configured to determine whether a particular paging message is the initial paging message or the at least one retransmission of the initial paging message.

9. The apparatus of claim 8, wherein the processing circuitry is further configured to:
determine retransmission spacing of the EC paging messages; and
determine whether to maintain a buffer during idle sleep periods of the UE dependent on the retransmission spacing.

10. The apparatus of claim 1, wherein:
the EC paging messages comprise an initial paging message and at least one retransmission of the initial paging message,
and
the processing circuitry is further configured to determine whether a particular paging message is the initial paging message or the at least one retransmission of the initial paging message based on which RNTI is used to encode an PDCCH associated with the particular paging message.

11. The apparatus of claim 10, wherein:
a PDCCH associated with the initial paging message is encoded with a first EC-P-RNTI and a PDCCH associated with the at least one retransmission is encoded with a second EC-P-RNTI different from the first EC-P-RNTI and from the P-RNTI.

12. The apparatus of claim 10, wherein:
a PDCCH associated with the initial paging message is encoded with the EC-P-RNTI and a PDCCH associated with the at least one retransmission is encoded with the P-RNTI.

13. The apparatus of claim 1, wherein the processing circuitry is further configured to:
determine, based on a position of a particular paging message in a paging cycle, which of an EC mode paging message or a legacy paging message the particular paging message is.

14. The apparatus of claim 1, wherein the processing circuitry is further configured to:
receive the EC paging messages from the eNB on legacy paging occasions rather than non-legacy paging occasions.

15. The apparatus of claim 1, wherein the processing circuitry is further configured to:
determine that the UE is in an EC mode in response to a determination that a link budget between the eNB and the UE is worse than a predetermined link budget.

16. The apparatus of claim 15, wherein the processing circuitry is configured to:
determine a predetermined number of EC paging messages to meet the link budget between the eNB and the UE, and
decode the combined EC paging message in response to combining the predetermined number of EC paging messages.

17. The apparatus of claim 1, further comprising:
an antenna configured to provide communications between the transceiver and the eNB.

18. An apparatus of an evolved Node-B (eNB) comprising:
a memory; and
processing circuitry in communication with the memo and configured to:
determine whether a user equipment (UE) attached to the eNB is in enhanced coverage (EC) mode;
encode a physical downlink control channel (PDCCH) with an EC Paging Radio Network Temporary Identifier (EC-P-RNTI), the EC-P-RNTI different from a P-RNTI and to differentiate between transmission of an EC paging message and a legacy paging message; and
encode multiple paging messages to the UE over at least one paging cycle in response to determining that the UE is in EC mode,
wherein successive ones of the paging messages are either the same or incrementally different.

19. The apparatus of claim 18, wherein:
the paging messages are transmitted on legacy paging occasions of multiple paging cycles, or
the paging messages are transmitted on non-legacy paging occasions within at least one paging cycle.

20. The apparatus of claim 18, wherein:
UE paging messages are transmitted to a plurality of different UEs in at least one occasion of the paging messages.

21. The apparatus of claim 18, wherein the processing circuitry is further configured to:
determine a coverage extension level, from a plurality of coverage extension levels, of the UE, a number of paging messages transmitted dependent on the coverage extension level of the UE.

22. The apparatus of claim 18, wherein:
the paging messages are transmitted within a single paging cycle using frequency hopping, or configure the transceiver to transmit at least one of the paging messages within each paging cycle of consecutive paging cycles.

23. The apparatus of claim 18, wherein:
the paging messages comprise an initial paging message and at least one retransmission of the initial paging message, and
the processing circuitry is further configured to determine whether a particular paging message is the initial paging message or the at least one retransmission of the initial paging message based on which RNTI is used to encode an PDCCH associated with the particular paging message.

24. The apparatus of claim 18, wherein:
a position of a particular paging message in the at least one paging cycle is dependent on which of an EC mode paging message or a legacy paging message the particular paging message is.

25. The apparatus of claim 24, wherein:
a PDCCH associated with the initial paging message is encoded with a first EC-P-RNTI and a PDCCH associated with the at least one retransmission is encoded with a second EC-P-RNTI different from the first EC-P-RNTI and from the P-RNTI.

26. The apparatus of claim 24, wherein:
a PDCCH associated with the initial paging message is encoded with the EC-P-RNTI and a PDCCH associated with the at least one retransmission is encoded with the P-RNTI.

27. A non-transitory computer-readable storage medium that stores instructions for execution by one or more processors of user equipment (UE) to communicate with an evolved Node-B (eNB), the one or more processors to configure the UE to:
enter an enhanced coverage (EC) mode;
determine whether a physical downlink control channel (PDCCH), received from the eNB is encoded with an EC Paging Radio Network Temporary Identifier (EC-P-RNTI) the EC-P-RNTI different from a P-RNTI and to differentiate between transmission of an EC paging message and a legacy paging message;
receive paging messages from the eNB, the paging messages including an initial paging message and at least one retransmission of the initial paging message;
combine the paging messages to form a combined paging message;
determine a link budget of the combined paging message;
compare the link budget of the combined paging message to a predetermined link budget associated with coverage in a cell dependent on the EC mode; and
decode the combined paging message, in response to determining that the link budget of the combined paging message has met the predetermined link budget, to determine whether the combined paging message is directed to the UE.

28. The non-transitory computer-readable storage medium of claim 27, wherein the processor further configured to at least one of:
determine whether a particular paging message is an EC mode paging message or a legacy paging message based on which RNTI is used to encode an PDCCH associated with the particular paging message, or
determine whether the particular paging message is the initial paging message or the at least one retransmission of the initial paging message based on which RNTI is used to encode the PDCCH associated with the particular paging message.

29. The non-transitory computer-readable storage medium of claim 27, wherein:
a PDCCH associated with the initial paging message is encoded with a first EC-P-RNTI and a PDCCH associated with the at least one retransmission is encoded with a second EC-P-RNTI different from the first EC-P-RNTI and from the P-RNTI.

* * * * *

UNITED STATES PATENT AND TRADEMARK OFFICE
CERTIFICATE OF CORRECTION

PATENT NO. : 9,648,582 B2  
APPLICATION NO. : 14/753158  
DATED : May 9, 2017  
INVENTOR(S) : Burbidge et al.

Page 1 of 1

It is certified that error appears in the above-identified patent and that said Letters Patent is hereby corrected as shown below:

In the Claims

In Column 18, Line 31, in Claim 1, after "(UE),", insert --the--

In Column 18, Line 40, in Claim 1, delete "(EC-P-RNTI)" and insert --(EC-P-RNTI),-- therefor In Column 19, Line 22, in Claim 7, delete "TIE" and insert --UE-- therefor In Column 19, Line 47, in Claim 10, after "message,", delete "¶"

In Column 20, Line 30, in Claim 18, delete "memo" and insert --memory-- therefor In Column 21, Line 35-36, in Claim 27, delete "(EC-P-RNTI)" and insert --(EC-P-RNTI),-- therefor Signed and Sealed this  
Fourth Day of June, 2019

Andrei Iancu  
*Director of the United States Patent and Trademark Office*